United States Patent [19]

Blake, III

[11] 4,429,962
[45] Feb. 7, 1984

[54] SOUND MOTION PICTURE APPARATUS WITH REMOVABLE CARTRIDGE

[75] Inventor: Joseph W. Blake, III, New Canaan, Conn.

[73] Assignee: Kenjamin Kinberg, New York, N.Y.

[21] Appl. No.: 298,088

[22] Filed: Aug. 31, 1981

[51] Int. Cl.³ .............................................. G03B 31/04
[52] U.S. Cl. ........................................ 352/32; 352/33; 352/72; 352/129
[58] Field of Search ...................... 352/32, 33, 35, 129, 352/72, 27

[56] References Cited

U.S. PATENT DOCUMENTS

| | | | |
|---|---|---|---|
| 2,196,358 | 4/1940 | Heinisch | 352/35 |
| 3,439,598 | 4/1969 | Weitzner et al. | 352/32 |
| 3,583,797 | 6/1971 | Schoenfield et al. | 352/32 |
| 3,923,387 | 12/1975 | Skinner et al. | 352/129 |
| 4,013,352 | 3/1977 | Monroy | 352/35 |
| 4,121,886 | 10/1978 | Gottschalk | 352/35 |
| 4,171,881 | 10/1979 | Lewis | 352/72 |
| 4,198,134 | 4/1980 | Ciupke et al. | 352/129 |

Primary Examiner—Monroe H. Hayes
Attorney, Agent, or Firm—Kontler, Grimes & Battersby

[57] ABSTRACT

Described is a motion-picture apparatus with a housing, a removable cartridge and an arrangement for reproducing a sound track in correlation with the action shown on a length of film contained in the cartridge.

10 Claims, 4 Drawing Figures

SOUND MOTION PICTURE APPARATUS WITH REMOVABLE CARTRIDGE

BACKGROUND OF THE INVENTION

The present invention relates to motion-picture apparatus.

More particularly, the invention relates to motion-picture apparatus having removable cartridges.

Still more specifically, this invention relates to sound motion picture apparatus having removable cartridges.

It has been proposed in the prior art to provide hand-held motion-picture viewers with removable cartridges. For example, U.S. Pat. Nos. 3,706,439 and 3,791,723 disclose such construction. These prior art devices are in need of further improvements and, moreover, they are incapable of providing sound along with the motion picture being shown.

SUMMARY OF THE INVENTION

Accordingly, it is an object of the present invention to provide further improvements over the prior art.

A more particular object of the invention is to provide a motion-picture apparatus with removable cartridges which incorporates the aforementioned improvements over the prior art.

Still a more specific object is to provide such an improved motion-picture apparatus as mentioned before, which provides sound accompaniment to the motion picture being shown.

A concomitant object of the invention is to provide an improved motion-picture apparatus of the type under discussion, which is of simple and reliable construction.

Yet a further object is to provide a motion-picture apparatus as outlined above, which is inexpensive to produce.

In keeping with these objects and still others which will become apparent hereafter, one aspect of the invention resides in a motion-picture apparatus in combination, a housing; a cartridge removably mountable in said housing and including an aperture, a length of motion-picture film in the cartridge, means for advancing the film frame-wise past the aperture; cooperating means on the housing and cartridge for operating the advancing means and means for reproducing a sound track which is correlatable with the action on the length of motion-picture film.

The invention will hereinafter be described with reference to exemplary embodiments, as illustrated in the appended drawings. It is to be understood, however, that these are intended merely to explain the invention and are in no way to be construed as limiting the invention to the illustrated and/or described features.

DESCRIPTION OF PREFERRED EMBODIMENTS

Figure 1:
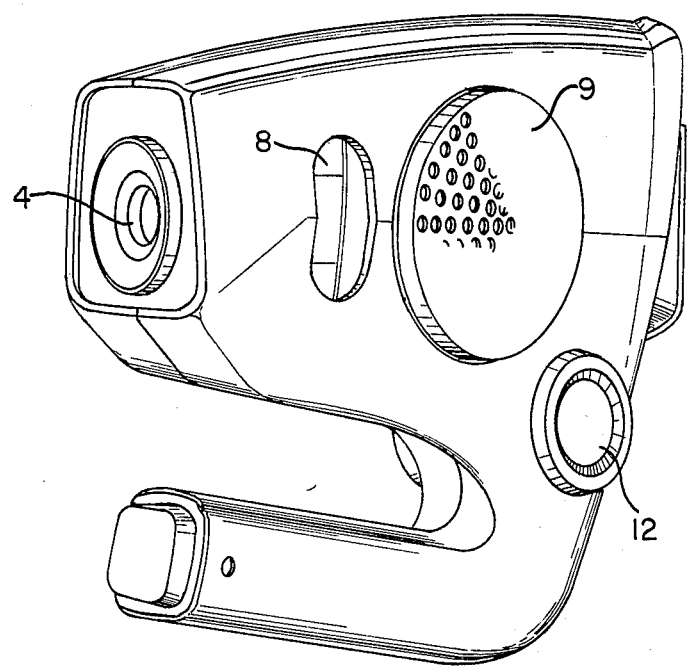
FIG. 1 is a right-side perspective view of a motion-picture apparatus embodying the invention.
Figure 2:
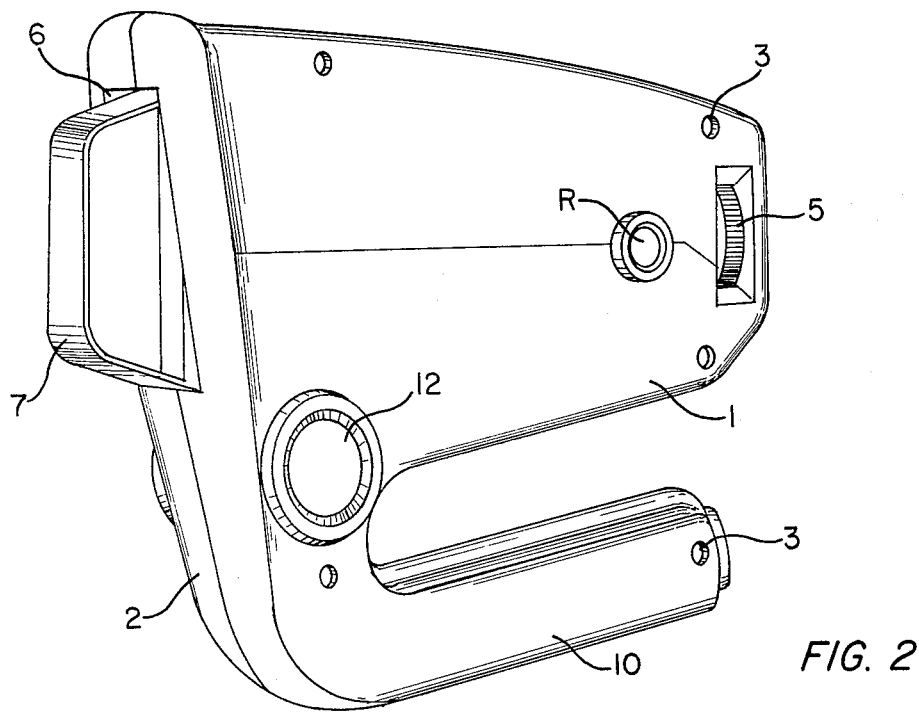
FIG. 2 is a left-side view of the apparatus in FIG. 1.

FIGS. 1 and 2 provide two perspective views of the apparatus according to the invention, in operative position. The shape and configuration illustrated in these Figures need by no means be as shown.

What is important is that the apparatus has a housing composed of two shell-shaped parts 1, 2 which, when their open sides face one another and the parts are held together in suitable manner (via e.g. the screws 3) will constitute the illustrated hollow housing. The parts 1, 2 may be made of any suitable material (e.g. aluminum, synthetic plastic) and be produced by any suitable method (e.g. press-molding, injection molding). At one end the housing has a lens assembly 4 which can be focussed by means of a knurled wheel 5 or similar device; since these may be similar to the elements 41, 42 described in U.S. Pat. No. 3,791,723, a more detailed description herein is not needed.

At the other (opposite) end the housing has an opening 6 for insertion of one of the interchangeable film cartridges 7. One side is provided near the lens assembly 4 with an opening 8 (which may be closed by a transparent cover) through which light can enter to illuminate the film (to be discussed later) in the cartridge 7. Reference numeral 9 identifies a perforated grill through which sound reaches the user; this could be omitted in favor of a simple opening. The handle 10 is hollow to form a battery compartement.

Figure 3:
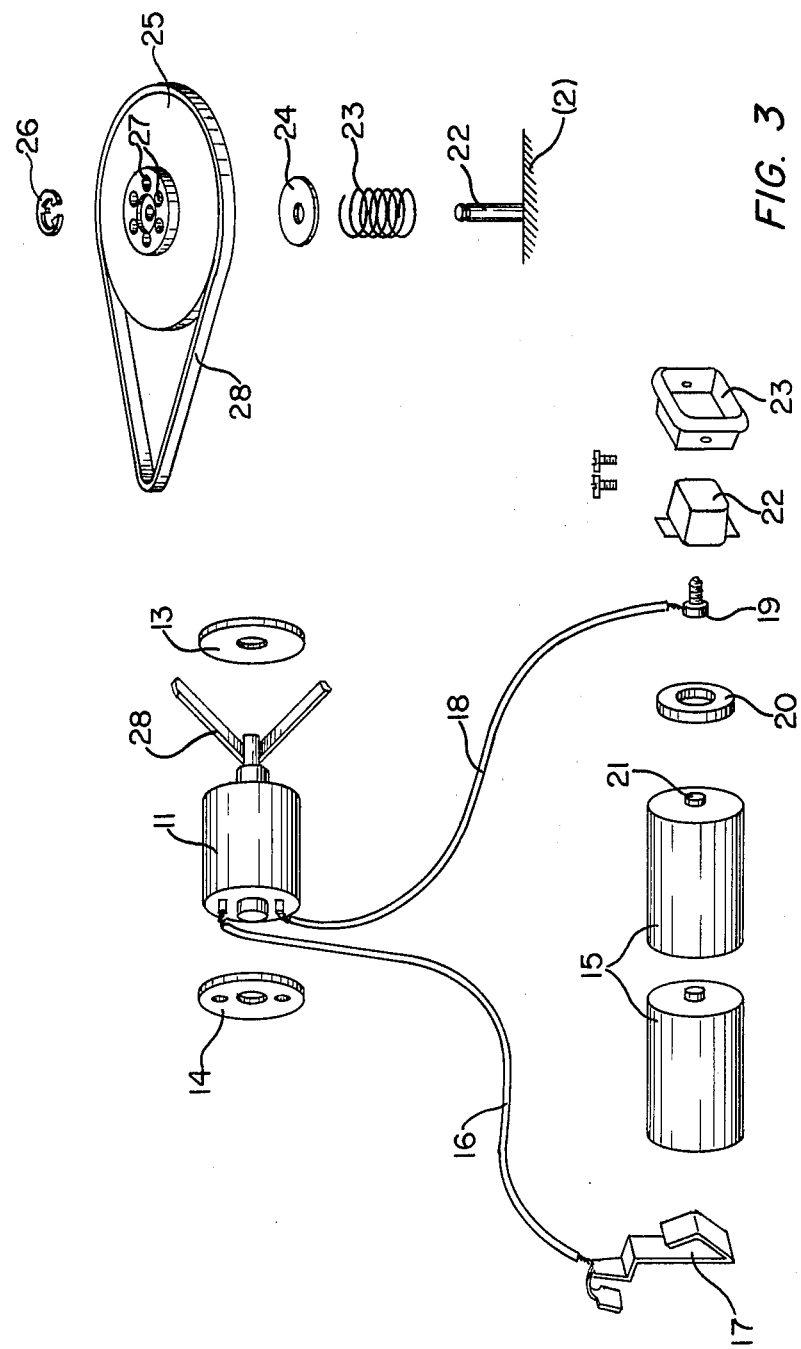
FIG. 3 is a schematic, exploded diagram, showing the motor drive of the apparatus in FIGS. 1 and 2.

FIG. 3 shows the motor arrangement and electrical circuit used in the apparatus of FIGS. 1 and 2. Motor 11 is mounted in a transverse space of the housing 1, 2 which is closed off at both ends by end covers 12 (see FIGS. 1 and 2). To assure vibration-free operation of the motor 11, washers 13, 14 of rubber or of synthetic elastomeric material are interposed between the ends of motor 11 and end covers 12; the latter mount the motor 11 in the housing 1, 2. Washers 13, 14 provide vibration-free suspension of motor 11 in the housing 1, 2. Batteries 15 are inserted into the hollow interior of handle 10. One of the motor leads 16 has a battery contact strip 17 for contact with the end of one of the batteries. The other motor lead 18 carries an electrical contact 19 which is normally out of contact with the positive pole of the other battery 15 by an interposed resiliently compressible cellular-plastic washer 20 the axial thickness of which is slightly greater than the axial length of positive battery pole 21. The contact 19 is closest to the open end of the hollow handle 10, i.e. the left-hand end in FIG. 1. Inserted into this open end is an axially slidable pushbutton 22 which is held in place (so that it cannot fall out) by the usual button-surround 23 or in other suitable manner. When the button 22 is depressed inwardly, it presses contact 19 against washer 20. This causes the latter to be compressed sufficiently so that contact 19 can engage battery pole 21 through the center opening of washer 20 and complete the electrical circuit of motor 11.

Also located in the hollow interior of housing 1, 2 but offset forwardly of the motor 11 (towards the lens assembly 4) is a shaft 22 which is mounted in one of the two housing shells 1, 2. A helical spring 23 surrounds the shaft 22 and is terminated with a washer 24. A drive wheel 25 is turnably mounted on the free end of shaft 22 (above washer 24) and is held in position by a circlip 26 snapped into a circumferential groove adjacent the free end of shaft 22. Thus, the drive wheel 25 can yield in direction towards the non-free end of shaft 22 (i.e. the end mounted in one of the housing shells) against the action of spring 23 when subjected to requisite pressure.

The arrangement is such that such pressure is exerted by insertion of a cartridge 7 into the opening 6. The drive wheel 25 then recedes just sufficiently to let the cartridge 7 slide by it; when the cartridge is fully inserted, drive nubs 7 on wheel 25 will be located opposite cooperating formations (still to be discussed) on the cartridge 7.

Wheel 25 is driven by a relatively stiff endless urethane drive belt 28 which surrounds the wheel 25 and the shaft of motor 11 (or a pulley thereon). Thus, depressing of push button 22 results in rotation of drive wheel 25.

Figure 4:
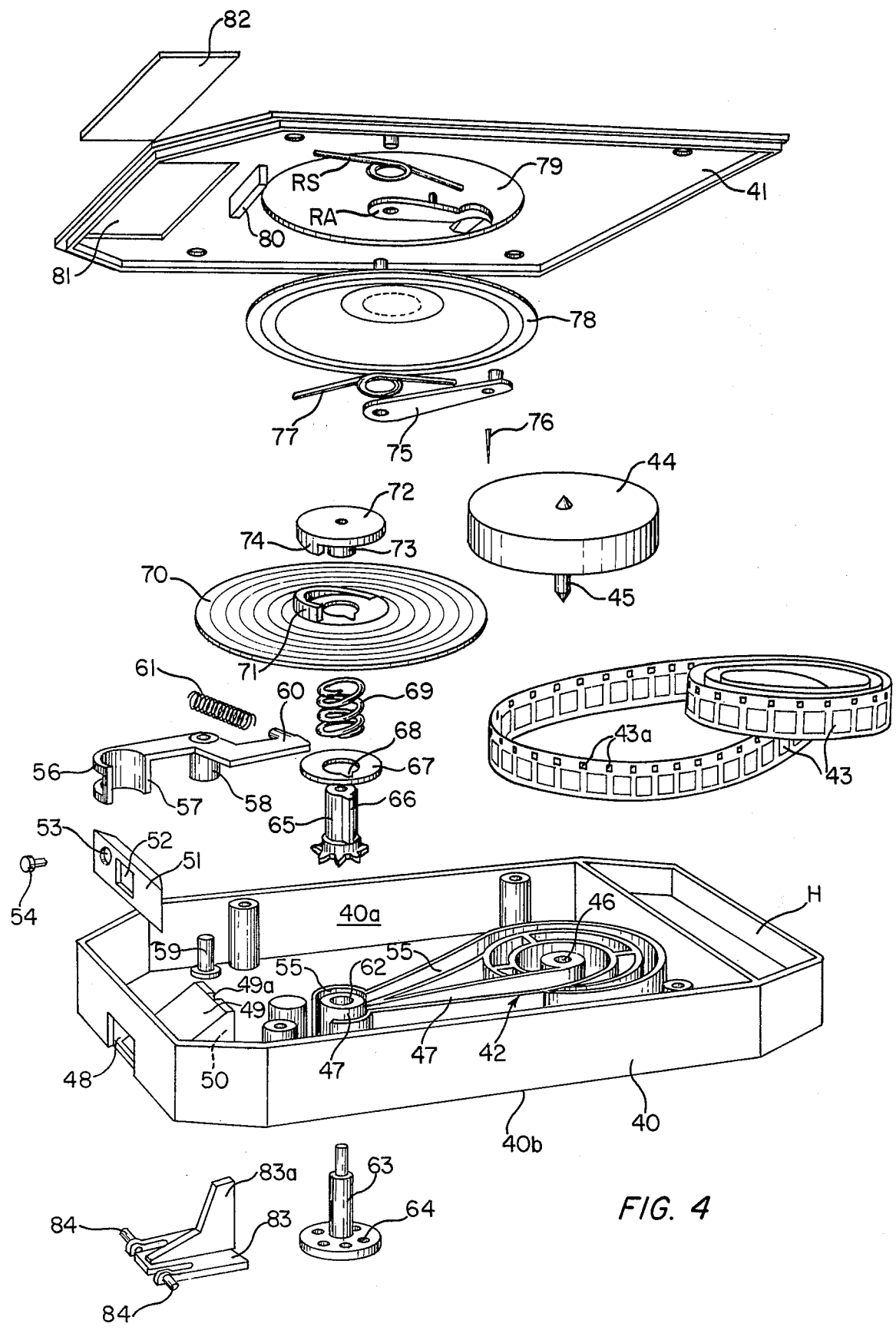
FIG. 4 is a schematic exploded diagram, showing the details of the replaceable sound and motion-picture cartridges for use in the apparatus of FIGS. 1–3.

FIG. 4 shows one of the replaceable cartridges (all identical, except for the subject matter on the endless film loop and the associated sound track) for use in the apparatus of FIGS. 1-3.

Reference numerals 40 and 41 identify the cartridge case and the cover of the same. Both may be of synthetic plastic material. Molded into the interior of the case 40 is a film guide track 42. The endless loop of motion-picture film 43 is coiled inside a hollow cap 44, a projection 45 of which is inserted into a corresponding hole 46 in case 40. The film strip is then withdrawn from the loop 43 along guide path 47 and passes an opening 48 of the case 40. Mounted (usually formed integrally with case 40) behind opening 48 is an inclined boss 49 which is hollow underneath (as indicated by the phantom line 50); the inclined surface of boss 49 carries or is formed as a mirror of any kind (i.e. glass-mirror, metallized plastic, or the like). Located behind the opening 48 is a metallic or synthetic plastic plate 51 (positioned to be immovable) provided with a cut-out 52 corresponding exactly or at least generally to opening 48. Plate 51 further has a single hole 53 in which a single film-ratchet pin 54 is mounted. Because an integral formation of pin 54 with plate 51, or direct-contact mounting of the two would result in excessive ratcheting noise (masking the sound track), the pin 54 is shock-mounted in hole 53 by means of silicone rubber. It should be noted, incidentally, that plate 51 could be omitted and hole 53 directly formed in case 40 laterally of the opening 48, in which case the pin 54 would be shock-mounted in this hole in case 40. The pin 54 of course cooperates with the perforations 43a in film 43 as the film is pulled past it in a manner still to be described.

After moving past the pin 54, the film returns via a film guide track 55 to the interior of cap 44, to be wound up therein. In so doing it must pass around a curved arm 56 (to emerge at 57 and travel to track 55) of a double-curved lever 58 which is pivoted on a pivot pin 59 of the case 40. The other arm 60 of lever 58 carries a spring 61 which bears against the adjacent side 40a of the case 40. The advancing film 43 tends to pivot the lever 58 anti-clockwise; since this is resisted by the spring 61, the film 43 is always maintained in taut condition.

The outlet of track 47 and the inlet of track 55 surround a hollow boss 62; a drive shaft 63 of a drive sprocket 64 (the latter located at the flat lateral side 40b of case 40) extends through the boss 62 where it is coupled with a tooth-type sprocket 65 having on its shaft a longitudinally extending key 66. The teeth of sprocket 65 engage with the perforations 43a to advance the film 43. A washer 67 is slipped onto the shaft of sprocket 65 and has a cut-out corresponding to key 66 so that washer 67 can turn with, but not relative to, the sprocket 65. Washer 67 also prevents film 43 from sliding up. Seated atop the washer 67 (and surrounding the shaft of sprocket 65) is a helical spring 62 which bears upon a record 70 carrying the sound track associated with the motion-picture on film 43, e.g. music and/or narration and/or live recordings. The center of record 70 has an opening and lateral cut-out corresponding to cut-out 68 so that the record is compelled to rotate with the sprocket 65, thereby assuring proper coordination between the motion-picture and the sound-track. This opening is surrounded over about half of its circumference by a first cam 71 which rises circumferentially in height. A member 72 has a center portion 73 receivable in the opening of record 70. Member 72 passes through 70 and fixes rigidly to the top of 63. Portion 73 carries a depending cam 74 which, except for the fact that it extends downwardly, is a counterpart to cam 71. Due to the fact that record 70 is seated on the helical spring 69, it can angularly tilt under certain conditions which will be described later.

A tone arm 75 carrying a needle 76 for the soundtrack of record 70, is mounted to cover 41. A return spring 77 is provided for returning the tone arm to its starting position when the needle 76 reaches the innermost sound track on record 70 (and when the end of film 43 passes opening 48). When arm 75 moves arm RA into the space between cams 71 and 74 to spread them apart. This shifts the record 70 downward, releasing the pressure on the tone arm exerted by record and speaker allowing the tone arm to return to its starting position under spring pressure. Tone arm 75 transmits its sound to a small e.g. cone-type speaker 78 which is mounted in an appropriate cut-out 79 of the cover 41; the cut-out 79 may remain open or provided with a grille in lieu of (or in addition to) the grill 9 of the apparatus in FIGS. 1-3. Abutment 80 on the underside of cover 41 delimits movement of the tone arm 75. Cover 41 also has a cut-out 81 for admission of light; this may simply remain open but, to protect the interior of the cartridge, had better be closed by a transparent sheet material 82 (a lens, or a plain piece of clear transparent synthetic plastic). Cover 41 is welded, screwed (as shown) or otherwise secured to case 40.

In the event that it should be desired to arbitrarily reset the sound track to its beginning, a record needle return element 83 is provided, which is let into the lateral side 40b of case 40, so as to be flush with that side. The element 83 is located in the hollow interior of boss 49 and is pivotable about two pivot pins 84. The boss 49 has a cut-out 49a and the element 83 has an upstanding "tail" 83a. When depressed (pivoted) inwardly of case 40, the tail 83a will rise up through cut-out 49a, pressing at one side against the underside of record 70. This causes the record to tilt as mentioned before, freeing the needle 76 and tone arm 75 which can now return to their original starting position.

The external reset button R (FIG. 2) simply interfaces with the member 83 (e.g. via an appropriate cam surface) so that the tone arm can be reset from the outside of housing 1, 2 without having to remove cartridge 7 therefrom. Portion H of the cartridge 9 (FIG. 4) is a convenient handle for inserting and removing the cartridge 7 from housing 1, 2.

The operation of the device will be clear from the description thus far. Batteries 15 are installed in the handle 10 of housing 1, 2 after removal of the push button and button surround, which are thereupon reinstalled. The housing 1, 2 is now ready to have a cartridge 7 inserted into it, with the opening 48 as the leading end. Cartridge 7 cams drive wheel 25 sideways so that it can slip past the wheel. Once the drive wheel 25 and drive sprocket 64 move into axial alignment with one another, the spring 23 presses drive wheel 25 firmly enough against the sprocket 64 to transmit rotary motion to the latter. The user then looks into lens assembly 4 and depresses button 22; this causes the motor 11 to advance the film strip 43 and to turn the record 70, so that the user simultaneously sees the action of the moving picture and hears the correlated sound from record 70. To reset the record (i.e. the tone arm 74) to the beginning, the user simply pushes reset button R (or, if the cassette is out of the housing, the member 83).

The apparatus according to the invention is especially well suited for use with short (endless) lengths of film, which may depict literally anything desired. For example, the film may be of a fairy tale or other subject matter appealing to a child. It may also be a training film, such as how to assemble a certain item of equipment, or how to play a certain sport (or certain aspects of a given type of sport). Since the apparatus operates quietly, especially due to the use of the single shock-mounted pin 54, as well as the mode or motor isolation, the attention of the user is not distracted from the sound tracks produced by the record 70.

The invention has hereinbefore been described with reference to specific embodiments, as illustrated in the drawings. However, various modifications are possible and may suggest themselves to those skilled in the art. All such modifications are intended to be comprehended within the meaning and scope of the appended claims.

I claim:

1. In a motion-picture apparatus, in combination,
a housing;
a cartridge removably mountable in said housing and including an aperture, a length of motion-picture film in the cartridge, and means for advancing said film frame-wise past said aperture;
cooperating means on said housing and cartridge for operating said advancing means;
means for reproducing a sound-track which is correlatable with the action on said length of motion-picture; and
means for continuously, automatically correlating said sound-track with the action on said length of motion-picture film even when, at a random midpoint in the length of the film, operation of the apparatus has been stopped without removal of the cartridge and then recommenced or operation has been stopped, the cartridge removed and reinserted and then operation recommenced.

2. A combination as defined in claim 1, said reproducing means including a record provided with the sound track, and a tone-arm and needle combination cooperating with said record.

3. A combination as defined in claim 2; and further comprising means for correlating said sound track with said action on the length of motion-picture film, including means operable at the option of a user for resetting said tone-arm and needle combination to a starting position relative to the record.

4. A combination as defined in claim 3, said last-mentioned means comprising manually operated means.

5. A combination as defined in claim 3, said last-mentioned means comprising manually operated pushbutton means.

6. A removable cartridge for use in a motion-picture apparatus of the type having a housing for receiving the cartridge, drive means for the cartridge and an optical assembly for forming an image, said cartridge comprising means forming a casing having an aperture therein and a hole spaced laterally to one side of said aperture, a single index pin shock-mounted in said hole, a continuous loop of perforated film having first and second runs, guide means for guiding said film past said aperture between said runs, means within the cartridge for receiving light and for supplying light to the film on the side of the film opposite the aperture whereby said film is illuminated and an image formed in the optical assembly, a single sprocket rotatably mounted in the cartridge and adapted to be driven in forward direction by the drive means, said sprocket engaging both said upper and lower runs, and means within said cartridge for forming a roll of said film enabling the film to be payed out from and taken up on said roll, said pin being adapted to engage the perforations in the film, a sound-track which is correlatable with the action on the film, means for reproducing said sound-track and means for continuously, automatically correlating said soundtrack with the action of said film irrespective of whether the drive means has been stopped and started or the cartridge has been removed and reinserted from the motion-picture apparatus at any point in the length of the film.

7. A cartridge as defined in claim 6, wherein said shock-mounting includes a neoprene-rubber mount for the pin.

8. A cartridge as defined in claim 6, wherein the shock-mounting includes an elastomeric-material mount for the pin.

9. A cartridge for retaining a continuous loop of perforated film in apparatus of the type having a housing for receiving the cartridge, drive means for the cartridge an audio assembly and an optical assembly, said cartridge comprising means forming a casing having an index plate, said index plate having an aperture substantially in alignment with the optical assembly when said cartridge is received in the housing, guide means for forming the film into first and second runs, additional guide means for guiding the film along said index plate past said aperture between the runs, said index plate having a single index pin at one side of the aperture for engaging the perforations in the film, means for receiving and supplying light to the side of the film opposite the aperture whereby the film is illuminated and an image is formed by the optical assembly, a single sprocket engaging both the runs and adapted to be rotated in a single direction by the drive means when said cartridge is received in the housing, and means within the cartridge for forming a roll of film whereby film can be payed out from and taken up on the roll.

10. In a motion picture apparatus, in combination a housing having an opening, a cartridge adapted to be removably mounted in said housing by insertion through the opening, said cartridge being formed with an aperture, a length of film disposed in the cartridge, said cartridge including driven means for advancing said length of film past the aperture, said housing having driving means, and spring means mounted in said housing for yieldably engaging said cartridge to retain it in the housing and yieldably urging said driving means into engagement with said driving means when said cartridge is inserted into the opening, said cartridge including a sound-track and sound means for reproducing a sound-track in correlation with the action on the length of film.

* * * * *